US005341300A

United States Patent [19]

Fujimoto

[11] Patent Number: 5,341,300

[45] Date of Patent: Aug. 23, 1994

[54] TROUBLE DIAGNOSIS DEVICE AND METHOD FOR EXHAUST GAS RETURN CONTROL DEVICE

[75] Inventor: Shinya Fujimoto, Hyogo, Japan

[73] Assignee: Mitsubishi Denki Kabushiki Kaisha, Tokyo, Japan

[21] Appl. No.: 946,100

[22] Filed: Sep. 17, 1992

[30] Foreign Application Priority Data

Sep. 18, 1991 [JP] Japan .................................. 3-238063

[51] Int. Cl.[5] ......................... F02B 47/08; G06F 15/48

[52] U.S. Cl. ........................... 364/431.06; 364/431.11; 123/571; 123/568

[58] Field of Search ............... 123/571, 568, 569, 570, 123/488; 364/431.01–431.12; 60/278, 301, 285

[56] References Cited

U.S. PATENT DOCUMENTS

| | | | |
|---|---|---|---|
| 4,440,140 | 4/1984 | Kawagoe et al. | 123/571 |
| 4,825,841 | 5/1989 | Norota et al. | 123/571 |
| 4,834,054 | 5/1989 | Hashimoto et al. | 123/571 |
| 5,005,552 | 4/1991 | Kawamura | 123/571 |
| 5,014,203 | 5/1991 | Miyazaki et al. | 364/431.06 |
| 5,050,084 | 9/1991 | Nakaniwa | 364/431.07 |
| 5,137,004 | 8/1992 | Takahata et al. | 123/571 |
| 5,152,273 | 10/1992 | Ohuchi | 123/577 |
| 5,190,017 | 3/1993 | Cullen et al. | 123/571 |

FOREIGN PATENT DOCUMENTS 62-51746 3/1987 Japan .

*Primary Examiner*—Thomas G. Black
*Assistant Examiner*—Jacques Harold Louis-Jacques
*Attorney, Agent, or Firm*—Sughrue, Mion, Zinn, Macpeak & Seas

[57] ABSTRACT

In a trouble diagnosis device for an exhaust gas return control system in which a returning amount of exhaust gas is changed at a predetermined value to obtain a variation between operating conditions of the engine under before thus changing and under after thus changing, and the variation is compared with a predetermined value, thereby to determine whether or not the exhaust gas return control system is out of order. A variation rate in the detection value of the operating conditions of the engine is obtained every predetermined period of time, and when the variation rate thus obtained exceeds a predetermined rate, the trouble diagnosis operation for the exhaust gas return control system is suspended.

7 Claims, 6 Drawing Sheets

TROUBLE DIAGNOSIS DEVICE AND METHOD FOR EXHAUST GAS RETURN CONTROL DEVICE

BACKGROUND OF THE INVENTION

This invention relates a trouble diagnosis device and method for an exhaust gas return control system which controls an operation of returning part of the exhaust gas of an internal combustion engine (hereinafter referred to merely as "an engine", when applicable) to the intake pipe of the latter (hereinafter referred to as "exhaust gas return" or "EGR", when applicable).

An EGR control device is generally provided for an engine to reduce injurious components such as $NO_x$ in the exhaust gas. An exhaust pressure control type EGR control device using an exhaust pressure transducer is popularly employed.

A trouble diagnosis device for an EGR control device has been disclosed, for instance, by Japanese Patent Application (OPI) No. 51746/1987 (the term "OPI" as used herein means an "unexamined published application"). The trouble diagnosis device operates as follows: When the engine is in steady operation, and an EGR control valve is open, the latter is temporarily closed, to suspend the exhaust gas returning operation. Under this condition, an operating condition of the engine is detected and stored as a detection value. The detection value thus stored is compared with the one detected before the EGR control valve is closed, and the result of comparison is utilized for detection of a trouble in the EGR control device.

The conventional trouble diagnosis device is designed as described above. Hence, when the amount of variation in the opening degree of the throttle valve exceeds a predetermined value, the trouble diagnosis operations is suspended, because it will greatly adversely affect the operation of the engine. However, the conventional trouble diagnosis device is still disadvantageous in the following point: That is, if, although the amount of variation in the opening degree of the throttle valve does not exceed the predetermined value, the variation rate in the opening degree of the throttle valve per unit time exceeds a predetermined value, then the trouble in the EGR control device is erroneously detected for instance because detection of the detection value of the engine operating condition is delayed.

SUMMARY OF THE INVENTION

Accordingly, this invention has been attained to eliminate the above-described difficulty accompanying a conventional trouble diagnosis device for an exhaust gas return control device.

More specifically, an object of the invention is to provide a trouble diagnosis device and method for an exhaust gas returns control device which can avoid being affected by an abrupt change in the load of an engine under test, and is able to detect trouble in the exhaust gas return control device with high accuracy.

The foregoing object and other objects of the invention have been achieved by the provision of a trouble diagnosis device for an exhaust gas return control device for returning part of the exhaust gas of an internal combustion engine to an intake pipe, the device comprising: means for changing a flow rate of the exhaust gas returned to said intake pipe from an initial flow rate to a predetermined flow rate; first detection means for detecting operating conditions of said internal combustion engine; diagnosing means which calculates a variation between the operation conditions detected by said first detection means under the initial flow rate and under the predetermined flow rate, and compares the variation of the operation conditions with a first predetermined value for diagnosing whether or not said exhaust gas return control system is out of order; second detection means for detecting a rate of the variation of the operating conditions every predetermined period of time; and means for suspending a trouble diagnosis operation for said exhaust gas return control system when the rate of the variation detected by said second detection means exceeds a second predetermined value.

Furthermore, in the device, the second detecting means is able to obtain two different variation rates in the operating condition of the engine at intervals of two different periods of time, respectively, and the suspending means suspends the trouble diagnosis operation for the exhaust gas return control device when at least one of the two variation rates in the operating condition exceeds the respective predetermined value.

When the variation rate in the operating condition of the invention provided every predetermined period of time exceeds the predetermined value, then detection of the operating condition of the engine for EGR trouble diagnosis may be delayed. Therefore, in this case, the suspending means operates to suspend the EGR trouble diagnosis operation.

Further, variations in the operating condition of the engine are obtained at intervals of relatively long and short periods of time. When at least one of the variations thus obtained meets the EGR trouble diagnosis operation suspending conditions, then the EGR trouble diagnosis operation is suspended.

The nature, principle, and utility of the invention will be more clearly understood from the following detailed description of the invention when read in conjunction with the accompanying drawings.

DETAILED DESCRIPTION OF THE INVENTION

One preferred embodiment of this invention will be described with reference to the accompanying drawings.

Figure 1:
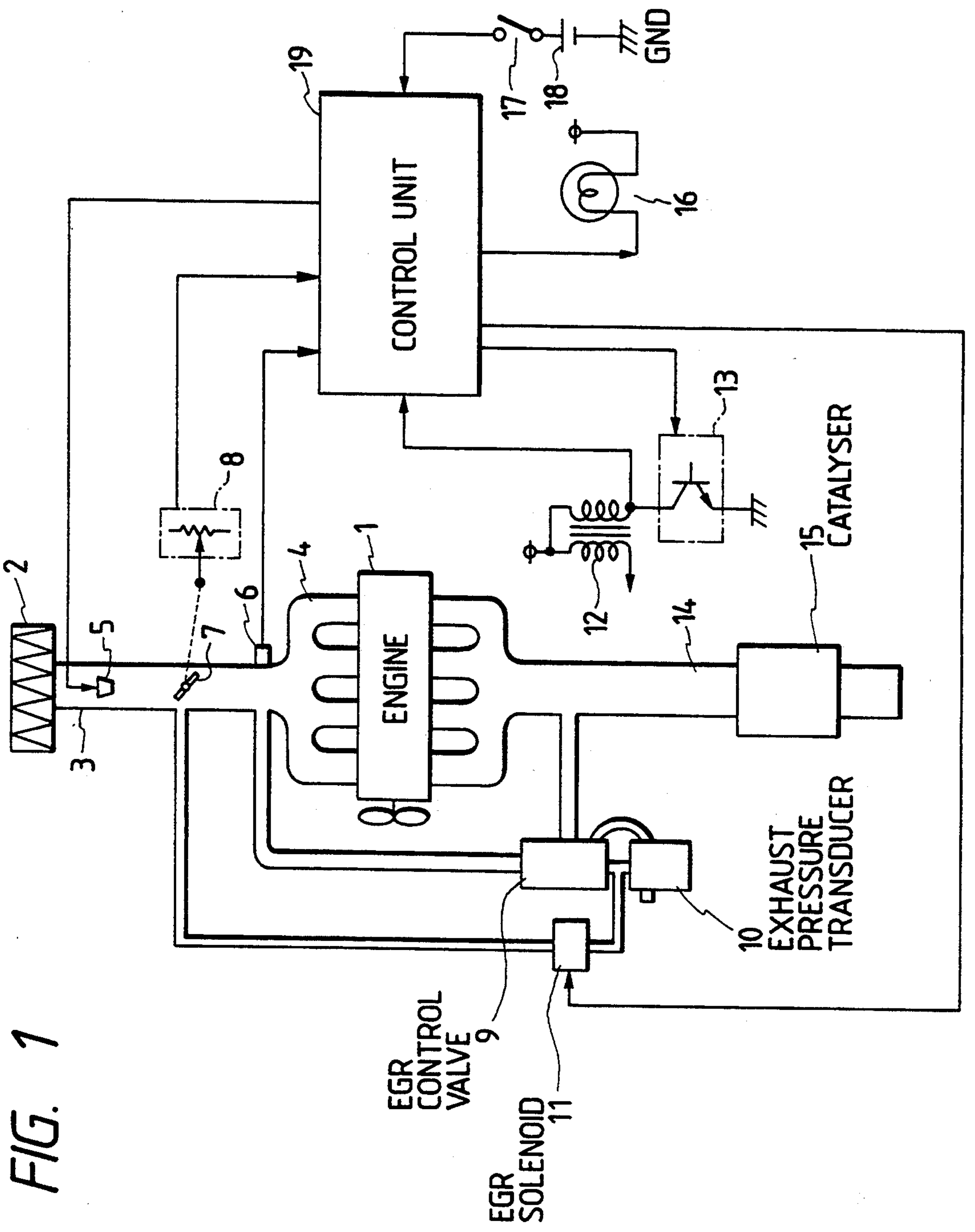
FIG. 1 is an explanatory diagram showing the arrangement of an engine section including a trouble diagnosis device for an exhaust gas return control device, which includes one embodiment of this invention.

As shown in FIG. 1, a four-cycle spark ignition type engine 1 mounted on a vehicle body intakes combustion air through an air cleaner 2, an intake pipe 3, and an intake manifold 4.

The engine receives fuel from a fuel system (not shown) through an injector 5 which is provided upstream of the throttle valve 7 of the intake pipe 3.

A throttle valve opening sensor 8 operates to detect an opening degree $\theta$ of the throttle valve 7 and output a signal corresponding to the opening degree $\theta$ thus detected. At the inlet of the intake manifold 4, that is downstream of the intake pipe 3, the absolute pressure PB in the intake pipe 3 is detected by a pressure sensor 6, which outputs a signal corresponding to thus intake pipe pressure PB.

The primary side of an ignition coil 12 is connected to a transistor in the final stage of an igniter 13, while the secondary side applies high voltage to ignition plugs (not shown) provided for the cylinders of the engine.

At least part of the exhaust gas of the engine is exhausted through an exhaust pipe 14 and a catalytic converter 15 for removing hazardous components. A part of the exhaust gas which flows into an exhaust branch pipe connected to the exhaust pipe 14 is allowed to flow into the intake pipe 3 through an EGR control valve 9, thus returning to the engine 1. An EGR negative pressure port is provided in the intake pipe 3 at a position which is slightly upstream of the end of the throttle valve 7, in which the position of the latter 7 is measured in a fully closed condition thereof.

An exhaust pressure transducer 10 receives the negative pressure from the EGR negative pressure port and the exhaust pressure from the exhaust gas branch pipe. The exhaust pressure transducer 10 applies the negative pressure from the EGR negative pressure port or an atmospheric pressure to the EGR control valve 9 according to the pressures thus received.

The EGR control valve 9 comprises a spring and a negative pressure chamber including a diaphragm. The EGR control valve 9 is used to control the flow rate of the exhaust gas flowing in a return pipe through which part of the exhaust gas is returned to the intake pipe. The exhaust pressure transducer 10 comprises: an exhaust pressure chamber; a diaphragm; a port which is confronted with the diaphragm and communicated with the EGR negative pressure port and the negative pressure chamber; an atmospheric pressure introducing chamber located next to the exhaust pressure chamber; a spring; and an atmospheric pressure introducing filter. These elements form a so-called "exhaust pressure control type EGR device".

An EGR solenoid 11 is provided between the exhaust pressure transducer 10 and the EGR negative pressure port. When the EGR solenoid 11 is activated, the negative pressure from the EGR negative pressure port is applied to the exhaust pressure transducer 10; and when it is deactivated, the atmospheric pressure is applied to the exhaust pressure transducer 10. That is, the EGR solenoid 11 serves as a three-way solenoid. The EGR solenoid 11 and the exhaust pressure transducer 10 are provided to control the sectional area of the passageway of the EGR control valve 9. When a fault in the EGR control device is detected, a warning lamp 16 is turned on to inform the operator of the fact that the EGR control device is out of order.

A control unit 19, receiving electric power from a battery 18 through a key switch 17, processes the output signals of the throttle valve opening sensor 8, the pressure sensor 6 and the ignition coil 12, thereby to control the injector 5, the EGR solenoid 11, the igniter 13, and the warning lamp 16.

Figure 2:
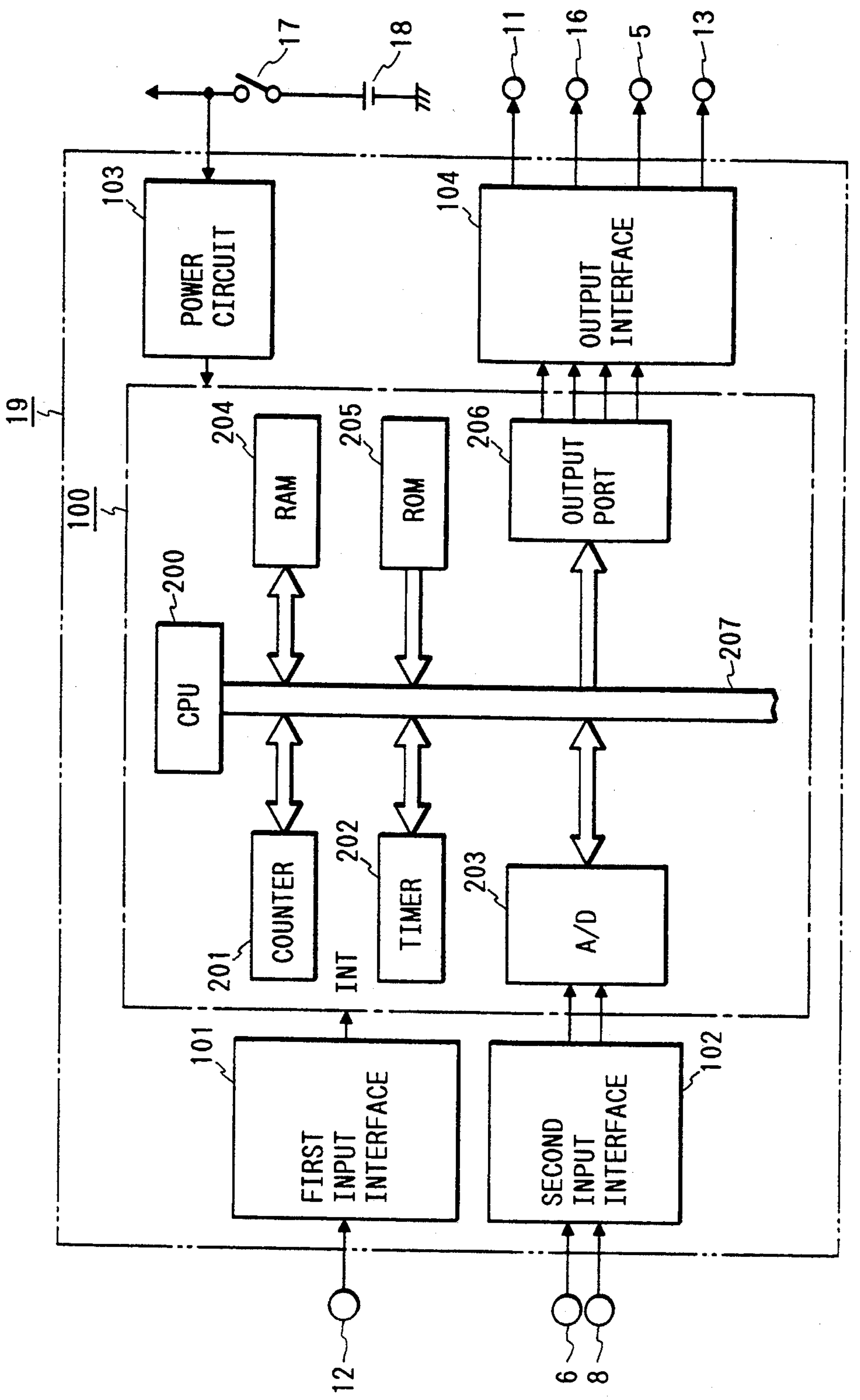
FIG. 2 is a block diagram showing the arrangement of a control unit shown in FIG. 1.

The internal arrangement of the control unit 19 is as shown in FIG. 2. In FIG. 2, a micro-computer 100 comprises: a CPU 200 for performing various arithmetic operations and decisions; a counter 201 for measuring a period of rotation; a timer 202 for measuring drive time; an analog-to-digital (A/D) converter 203 for converting an analog signal into a digital signal; a RAM 204; a ROM 205 in which the program of a main flow shown in FIG. 3 has been stored; an output port 206 for transmitting instruction signals from the CPU 200; and a common bus 207.

An ignition signal from the primary side of the ignition coil 12 is applied to a first input interface circuit 101, where, being suitably processed, for instance, by waveform shaping, it is converted into an interrupt instruction signal INT. The interrupt instruction signal INT is applied to the micro-computer 100. Whenever the interrupt occurs in this manner, the CPU 200 in the micro-computer 100 reads the count value of the counter 201, and compares it with the preceding count value, to calculate the period of rotation of the engine from the difference between the two count values.

Thereafter, the micro-computer 100 calculates a speed-of-rotation data Ne representing an engine speed-of-rotation $N_E$ of the engine. The analog output signals of the throttle valve opening sensor 8 and the pressure sensor 6 are applied to a second input interface circuit 102, which operates to remove noise components from those signals and amplify the latter. The output signals thus processed are applied to the A/D converter 203, where they are converted into digital signals which are a throttle valve opening degree value $\theta$ representing a throttle valve opening degree $\theta$ ($\theta \propto \theta$), and an intake pipe pressure value Pb representing an intake pipe pressure PB (PB $\propto$ Pb).

The drive signals from the output port 206 are applied to an output interface circuit 104, where they are, for instance, amplified. The drive signals thus processed are applied to the EGR solenoid 11, the warning lamp 16, etc. to control them. When the key switch 17 is turned on, with the aid of a power source circuit 103 the voltage of the battery 18 is applied, as a constant voltage, to the micro-computer 100 to activate the latter.

The control unit 19 is made up of the above-described micro-computer 100, first and second input interface circuits 101 and 102, power source circuit 103, and output interface circuit.

Figure 3:
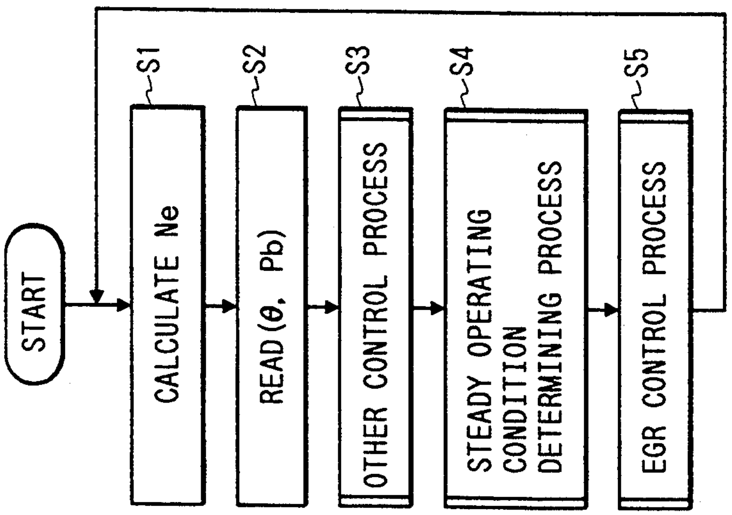
FIG. 3 is a flow chart showing main operations of the control unit of the exhaust gas return control device.

The operation of the embodiment (the operation of the CPU 200) included in an EGR control will be described with reference to FIG. 3.

In Step S1, the speed-of-rotation data Ne representing the engine speed-of-rotation $N_E$ is obtained from the period of rotation which has been obtained before. In Step S2, input data such as a throttle valve opening degree value $\theta$ representing a throttle valve opening degree $\theta$ and an intake pipe pressure value Pb representing an intake pipe pressure PB are read.

In Step S3, according to the speed-of-rotation data Ne and the input data such as the previously read intake pipe pressure data Pb and throttle valve opening degree value $\theta$, the CPU operates for control operations such as a fuel supply control operation, and ignition timing control operation (the detailed descriptions of which are omitted) other than those described later.

Figure 4:
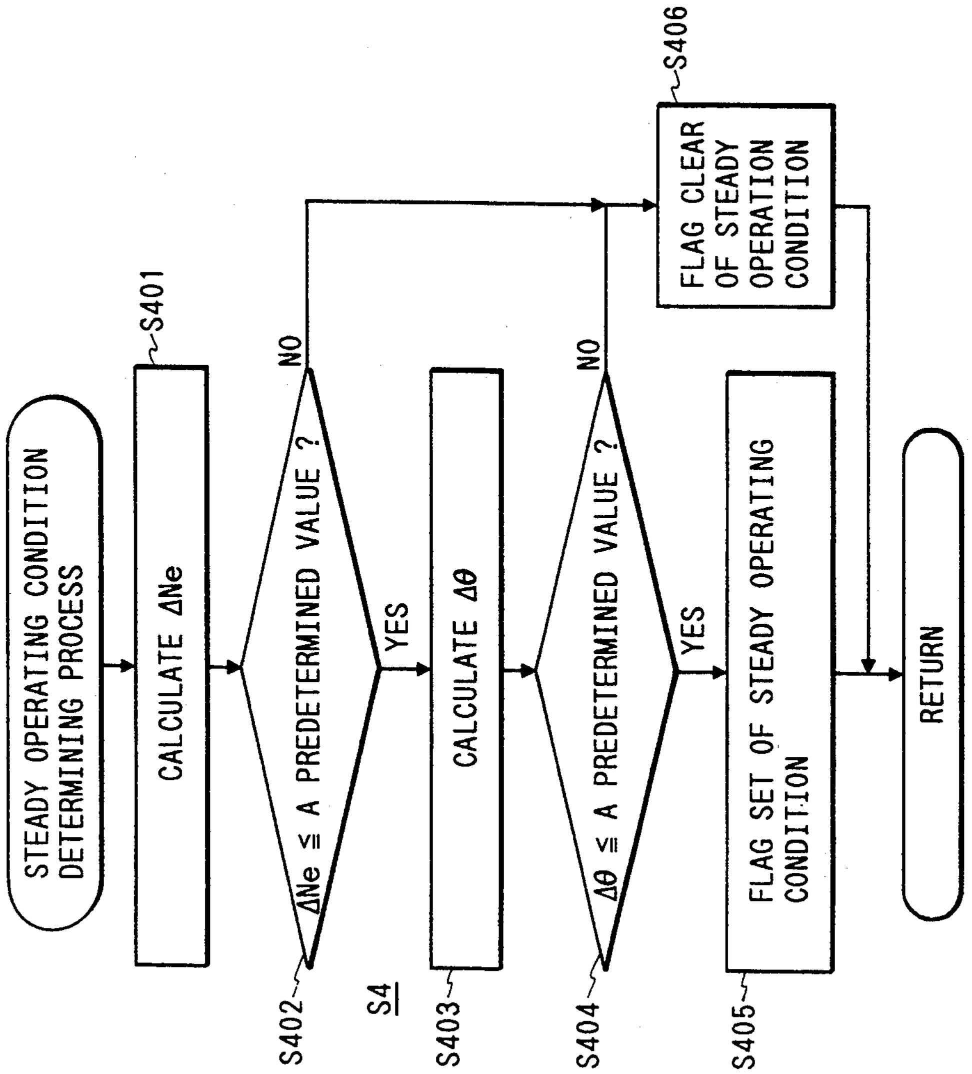
FIG. 4 is a flow chart showing a steady operation state determining operation in the control unit.

In Step S4, according to the previously obtained speed-of-rotation data Ne and the previously read throttle valve opening degree value $\theta$, the CPU operates a determination process for steady operation state as indicated in FIG. 4.

Figure 5:
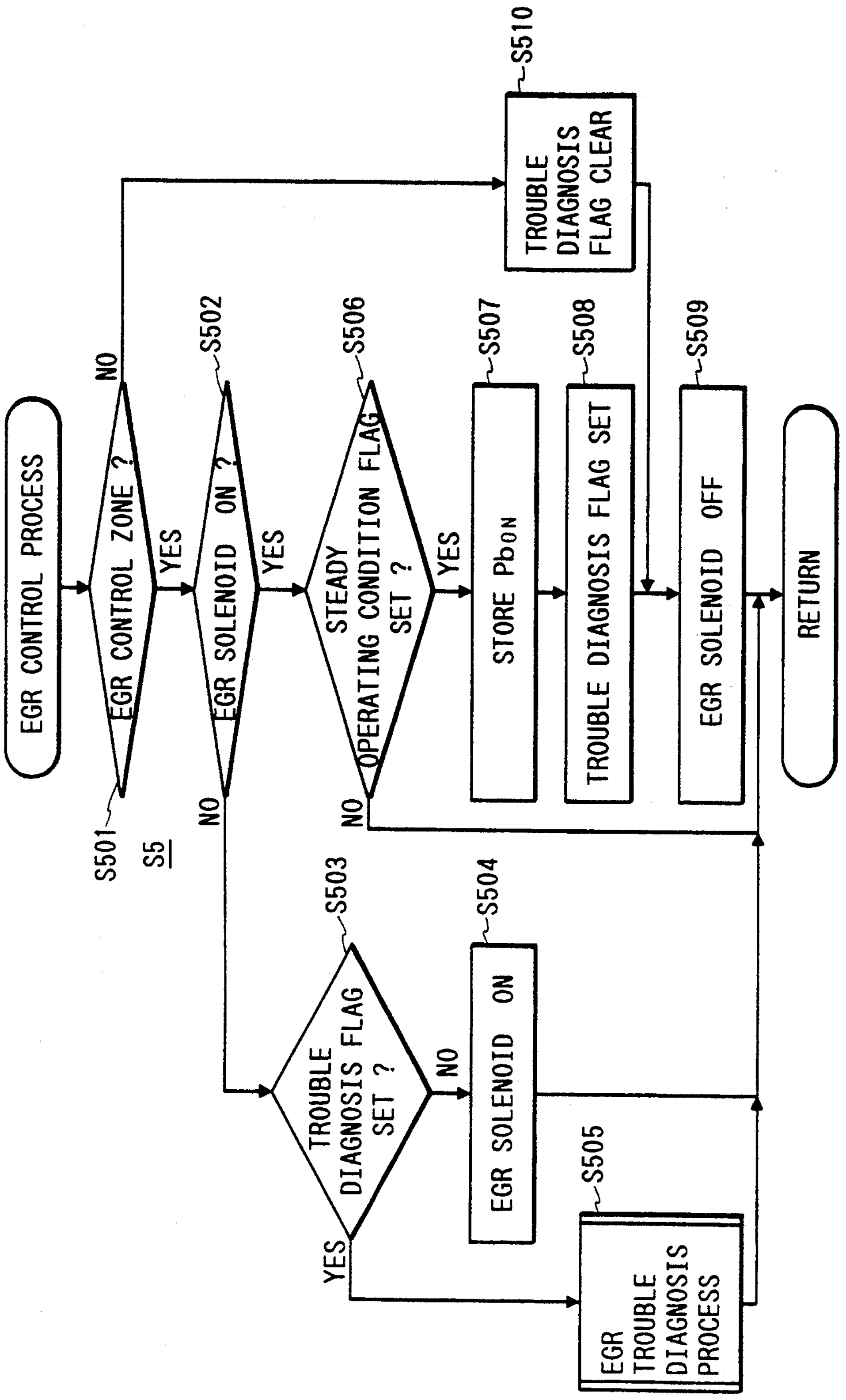
FIGS. 5 and 6 are flow charts showing an exhaust gas return control operation in the embodiment.

In Step S5, according to the previously obtained speed-of-rotation data Ne, and the previously read intake pipe pressure value Pb and throttle valve opening degree value $\theta$, the CPU operates for the EGR control operation as indicated in FIG. 5. After Step S5, Step S1 is effected, to perform the above-described operations repeatedly.

The operation in Step S4 will be described with reference to FIG. 4 in detail.

In Step 401, the absolute value $\Delta$Ne of the difference between a newly obtained speed-of-rotation data Ne and the previously obtained speed-of-rotation data Ne is calculated. Thereafter, Step 402 is effected. In Step 402, it is determined whether or not the absolute value $\Delta$Ne exceeds a predetermined value; i.e., whether or not the variation in the speed of rotation exceeds a predetermined value. When it does not exceed the predetermined value, Step S403 is effected; whereas when it exceeds the predetermined value, Step S406 is effected.

In Step S403, the absolute value $\Delta\theta$ of the difference between a newly read throttle valve opening degree value $\theta$ and the previously read throttle valve opening degree value $\theta$ is calculated. Thereafter, Step S404 is effected.

In Step S404, it is determined whether or not the absolute value $\Delta\theta$ exceeds a predetermined value; i.e., whether or not the variation in the opening degree of the throttle valve exceeds a predetermined value. When it does not exceed the predetermined value, Step 405 is effected; whereas when it exceeds the predetermined value, Step 406 is effected.

In Step S405, since the variation in the engine speed-of-rotation $N_E$ does not exceed the predetermined value, and the variation in the throttle valve opening degree $\theta$ does not exceed the predetermined value, it is determined that the engine 1 is in steady operation, and a steady operation state flag for use in Step S5 is set.

In Step S406, since the variation in the engine speed-of-rotation $N_E$ exceeds the predetermined value, or the variation in the throttle valve opening degree $\theta$ exceeds the predetermined value, it is determined that the engine is not in steady operation, and the steady operation state flag for use in Step S5 is reset. After Step S405 or S406, the steady operation state determining operation is ended.

The operations in Step S5 shown in FIG. 3 will be described with reference to FIG. 5 in detail.

In Step S501, it is determined whether or not newly obtained speed-of-rotation data Ne and intake pipe pressure data Pb are in an EGR control zone which is predetermined and stored, namely, m operating zone requiring EGR; that is, it is determined whether or not the operating condition of the engine is in the zone requiring EGR. When those data are not in the EGR control zone, Step S510 is effected. In Step S510, an EGR trouble diagnosis execution flag is cleared which is used in Step S503 and Step S505. That is, an EGR trouble diagnosis operation is suspended even when it is being carried out, and Step S509 is effected.

On the other hand, when in Step S501 it is determined that the data Ne and Pb are in the EGR control zone, Step S502 is effected. In Step S502, it is determined whether or not the EGR solenoid 11 has been activated (on). When it is determined that the EGR solenoid 11 has been activated, Step S506 is effected. In Step S506, it is determined whether or not the steady operation state flag to be set in Step S4 has been set. When it is determined that the steady operation state flag has been set, Step S507 is effected. When the flag has not been set yet, the EGR control operation of Step S5 is ended.

In Step S507, an operating condition detection value (which is the intake pipe pressure value Pb read in Step S2) is stored which is provided when the EGR is active and which is used in an EGR trouble diagnosis operation of Step S505. Thereafter, Step S508 is effected.

In Step S508, an EGR trouble diagnosis execution flag is set which represents the fact that a trouble diagnosis operation is being performed for the EGR control device. Thereafter, Step S509 is effected. In Step S509, the EGR solenoid 11 is deactivated (off); that is, the atmospheric pressure is applied to the exhaust pressure transducer 10, to forcibly close the EGR control value 9. Thus, the EGR control operation in Step S5 is ended.

On the other hand, in the case where, in Step S502, the EGR solenoid is not activated yet (i.e., it is in "off" state), Step S503 is effected, in which it is determined whether or not the EGR trouble diagnosis execution flag has been set.

When it is determined that the EGR trouble diagnosis execution flag has not been set; i.e., when it is determined that the EGR trouble diagnosis operation is not performed, Step S504 is effected. In Step S504, the EGR solenoid 11 is activated so that the pressure in the EGR negative pressure port is applied to the exhaust pressure transducer 10; that is, the EGR control valve 9 is operated for exhaust pressure control. Thus, the EGR control operation in Step S5 is ended.

Figure 6:
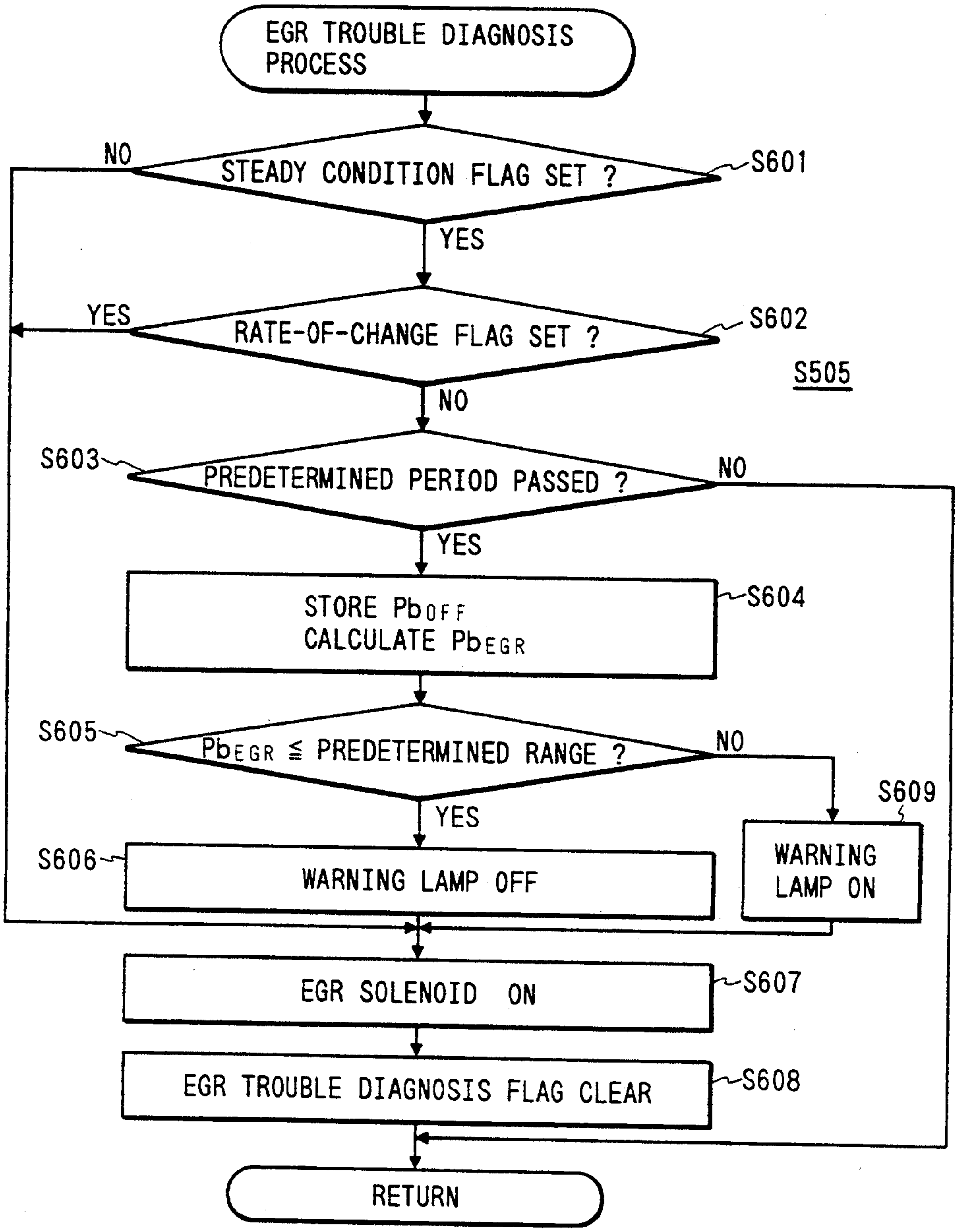

When, in Step S503, it is determined that the EGR trouble diagnosis execution flag has been set; that is, when it is determined that the EGR trouble diagnosis operation is being carried out, Step S505 is effected- In Step S505, an EGR trouble diagnosis operation as shown in FIG. 6 in detail is carried out. Thus, the EGR control operation in Step S5 is ended.

The EGR trouble diagnosis operation in Step S505 in FIG. 5 will be described with reference to FIG. 6 in detail.

In Step S601, it is determined whether or not the steady operation state flag to be set in Step S4 has been set. When it is determined that the flag has not been set yet; that is, when it is determined that the engine is not in steady operation, Step S607 is effected. When it is determined that the flag has been set; that is, when it is determined that the engine is in steady operation, Step S602 is effected.

Figure 7:
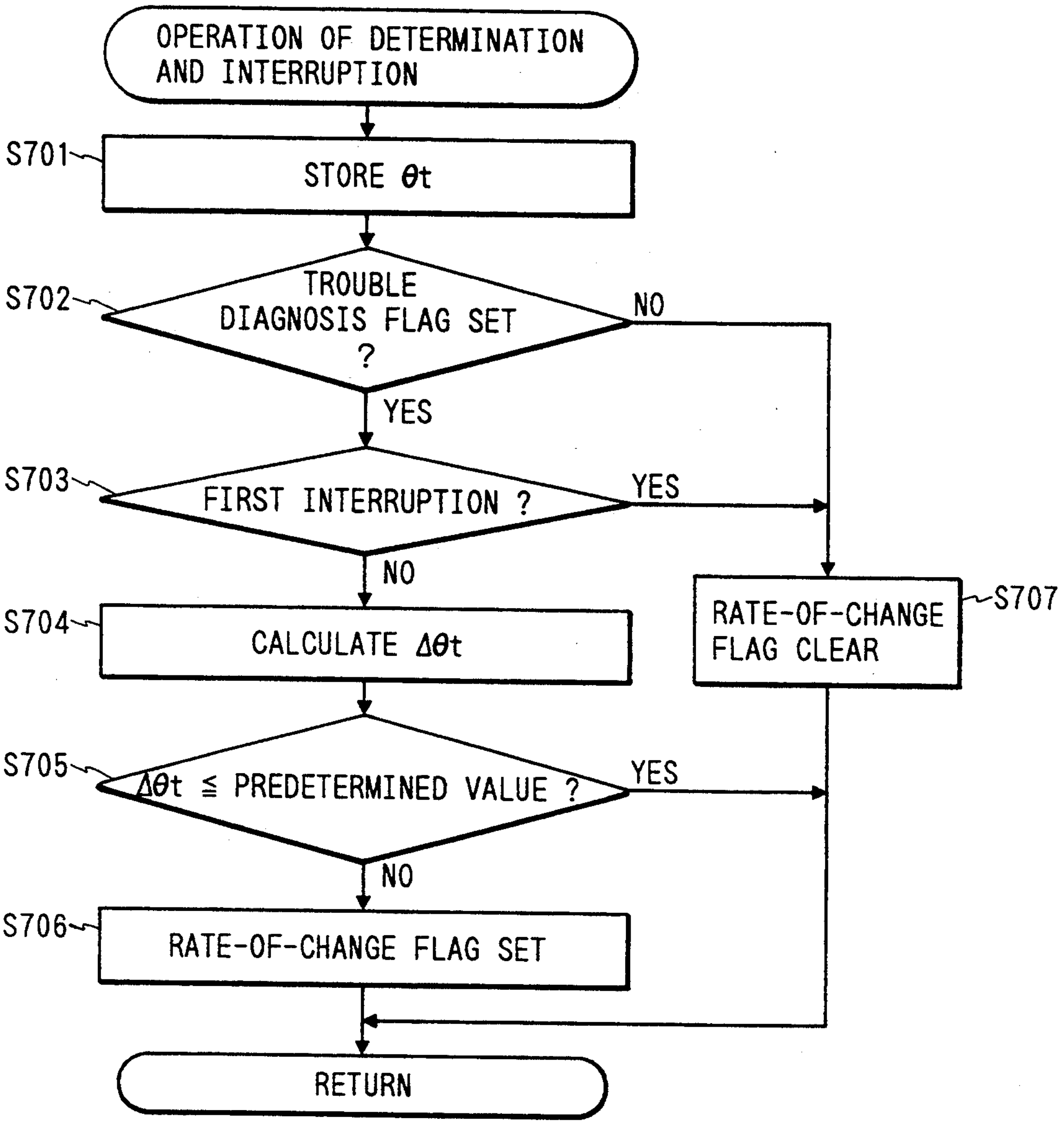
FIG. 7 is a flow chart for a description of an operation of interruption for determining a throttle valve opening degree rate-of-change in the embodiment.

In Step S602, it is determined whether or not a throttle valve opening degree rate-of-change flag has been set which is to be set by an operation of determination of changing rate of throttle valve opening degree and interruption thereby, which is shown in FIG. 7 in detail. When it is determined that the flag has been set; that is, in the case where the variation in the throttle valve opening degree $\theta$ per unit time is large, Step S607 is effected to suspend the EGR trouble diagnosis operation. On the other hand, in the case where the flag has not been set; that is, the variation in the throttle valve opening degree per unit time is small, Step S603 is effected to continue the EGR trouble diagnosis operation.

In Step S603, it is determined whether or not a predetermined period of time has been passed since the EGR trouble diagnosis execution flag was set. The predetermined period of time is obtained through experiments in advance; that is, it is the time which elapses from the time of deactivation of the EGR solenoid 11 until the operating condition detection value used for the trouble diagnosis operation is provided. It may be changed according to the operating conditions of the engine.

When, in Step S603, it is determined that the predetermined period of time has not passed yet, the EGR trouble diagnosis operation of Step S505 is ended. When, in Step S603, it is determined that the predetermined period of time has passed, Step S604 is effected. In Step S604, the operating condition detection value (which, in the embodiment, is the intake pipe pressure value Pb read in Step S2) which is provided when the EGR is not active (off), is stored, and it is compared with the operating condition detection value which, in Step S507, is provided when the EGR is active (on) and is stored, so that the difference between those detection values ($Pb_{EGR}=PB_{ON}-Pb_{OFF}$) is obtained. Thereafter, Step S605 is effected.

In Step S605, it is determined whether or not the difference between the detection values obtained in Step S604 is a value exceeding a first predetermined value and not exceeding a second predetermined value; that is, it is determined whether or not the difference is in a predetermined range of from the first predetermined value to the second predetermined value. The first and second predetermined values are obtained through experiments, and may be changed according to the operating conditions of the engine.

When, in Step S605, it is determined that the difference between the operating condition detection values is in the predetermined range, Step S606 is effected. That is, in Step S606, it is determined that the EGR control device is normal in operation, and the warning lamp 16 is turned off. Thereafter, Step S607 is effected. On the other hand, when, in Step S605, it is determined that the difference is not in the predetermined range, Step S609 is effected. That is, in Step S609, on the basis that the EGR control device is abnormal in operation, the warning lamp 16 is turned on. Thereafter, Step S607 is effected.

In Step S607, EGR solenoid 11 is activated, that is, the exhaust pressure transducer 10 applies the negative pressure from the EGR negative pressure port, and the EGR exhaust pressure valve 9 is controlled by the exhaust pressure. Thereafter Step S608 is effected. In Step S608, EGR trouble diagnosis flag is clear, that is, it is shown that the trouble diagnosing operation of EGR control device is not activated. Thus, the EGR trouble diagnosis operation of Step S505 is ended.

Now, the operation of determination of rate-of-change of throttle valve opening degree and interruption thereby will be described with reference to FIG. 7 in detail. This operation is carried out with an interrupt occurring every predetermined period of time (for instance every 5 ms).

First, in Step S701, a throttle valve opening degree value $\theta$ is read, and stored as $\theta_t$. Thereafter, Step S702 is effected.

In Step S702, it is determined whether or not the EGR trouble diagnosis execution flag has been set. When it has been set, Step S703 is effected; and when not, a jump is made so as to effect Step S707.

In Step S703, it is determined whether or not the interrupt is the one which has occurred for the first time after the setting of the EGR trouble diagnosis execution flag. When it is the first interrupt, Step S707 is effected; and when not, Step S704 is effected.

In Step S707, the flag of the rate-of-change of the throttle valve opening degree used in Step S505 is cleared. Thus, the operation of determination of rate-of-change of throttle valve opening degree and interruption thereby is ended.

On the other hand, in Step S704, the absolute value of the difference between a newly read and stored throttle valve opening degree value $\theta_t$ and the previously read and stored throttle valve opening degree value $\theta_t$; i.e., the variation $\Delta\theta_t$ in the throttle valve opening degree value in a predetermined period of time, is obtained. Thereafter, Step S705 is effected. The variation $\Delta\theta_t$ of the opening degree value of the throttle is equal a variation in the opening degree of the throttle per predetermined period of time.

In Step S705, it is determined whether or not the variation $\Delta\theta_t$ obtained in Step S704 exceeds a predetermined value. When it does not exceed the predetermined value, the operation of determination of rate-of-change of throttle valve opening degree and interruption thereby is ended. When the variation $\Delta\theta_t$ exceeds the predetermined value, then Step S706 is effected. In Step S706, the flag of the rate-of-change of throttle valve opening degree for use in Step S506 is set. Thus, the operation of determination of rate-of-change of throttle valve opening degree and interruption thereby is ended.

As was described above, the variation in the engine operating condition detection value (which is the throttle valve opening degree value in the embodiment) is obtained every predetermined period of time, and when the variation thus detected exceeds the predetermined value; that is, when the variation in the load of the engine per predetermined period of time (which is the variation in the throttle valve opening degree per predetermined period of time in the embodiment), the flag of rate-of-change of throttle valve opening degree is set, to suspend the trouble diagnosis operation for the EGR control device. That is, in the embodiment, when the variation in the opening degree of the throttle valve per predetermined period of time exceeds the predetermined value, with which the detection of the engine operating condition detection value is delayed, then the flag of the rate-of-change of throttle valve opening degree is set, and the trouble diagnosis operation for the EGR control device is suspended. In the case when the variation does not exceed the predetermined period of time, the detection of the engine operating condition detection value is not delayed, and therefore the flag is cleared, and the trouble diagnosis operation for the EGR control device is continued.

In the above-described embodiment, the operation of determination of rate-of-change of throttle valve opening degree and interruption thereby is carried out every predetermined period of time (for instance 5 ms); however, the variation in the opening degree of the throttle valve may be detected by performing interruption at intervals of a plurality of predetermined periods of time (for instance 10 ms and 15 ms).

As was described above, in the invention, the variation in the detection value of the engine operating condition is obtained every predetermined period of time, and when the variation thus detected exceeds the predetermined value, the trouble diagnosis operation for the EGR control device is suspended. Hence, the trouble diagnosis operation can be accurately achieved without being adversely affected, for instance, by the delay in detecting the detection value of the operating condition of the engine which is used for trouble diagnosis.

What is claimed is:

1. A trouble diagnosis device for an exhaust gas return control system which returns part of gas exhausted from an internal combustion engine to an intake pipe, said trouble diagnosis device comprising:

means for changing a flow rate of the exhaust gas returned to said intake pipe from an initial flow rate to a predetermined flow rate;

first detecting means for detecting operating conditions of said internal combustion engine;

diagnosing means for calculating a variation between one of said operating conditions detected by said first detection means under the initial flow rate and under the predetermined flow rate, and for comparing the variation of said one of the operating conditions with a first predetermined value for determining whether said exhaust gas return control system is out of order;

second detection means for detecting a rate of change of a second one of the operating conditions every predetermined period of time independent from a detecting operation performed by said first detection means; and means for suspending a trouble diagnosis operation for said exhaust gas return control system when the rate of change detected by said second detection means exceeds a second predetermined value, said rate of change being determined by a difference between a current detected value representing said second one of the operating conditions and an immediately preceding detected value representing said second one of the operating conditions.

2. The trouble diagnosis device as claimed in claim 1, wherein said initial flow rate comprises a highest flow rate by which the exhaust gas is returned to said intake pipe until a limit thereof.

3. The trouble diagnosis device as claimed in claim 1, wherein said predetermined flow rate comprises that the flow rate of the exhaust gas returning to said intake pipe is 0.

4. The trouble diagnosis device as claimed in claim 1, wherein said first predetermined value corresponds to a value between said initial flow rate and the predetermined flow rate.

5. The trouble diagnosis device as claimed in claim 1, wherein said first detecting means comprises at least one of a pressure sensor in said intake pipe, a throttle opening degree of said engine and a revolution number of said engine.

6. A trouble diagnosis device for an exhaust gas return control system which returns part of gas exhausted from an internal combustion engine to an intake pipe, said trouble diagnosis device comprising:

means for changing a flow rate of the exhaust gas returned to said intake pipe from an initial flow rate to a predetermined flow rate, first detecting means for detecting operating conditions of said internal combustion engine;

diagnosing means for calculating a variation between one of said operating conditions detected by said first detecting means under the initial flow rate and under the predetermined flow rate, and for comparing the variation of said one of the operating conditions with a first predetermined value for determining whether said exhaust gas return control system is out of order, second detecting means for detecting two different rates of change of a second one of the operating conditions at intervals of two different predetermined periods of time, respectively, and suspending means for comparing said two rates of change with two different predetermined values, respectively, and for suspending said trouble diagnosis operation of said exhaust gas return control system when at least one of said rates of change of said second one of the operating conditions exceeds the respective predetermined values.

7. A trouble diagnosis method for an exhaust gas return control system which returns part of gas exhausted from an internal combustion engine to an intake pipe, said method comprising the steps of:

changing a flow rate of the exhaust gas returned to said intake pipe from an initial flow rate to a predetermined flow rate by flow rate changing means;

detecting operating conditions of said internal combustion engine by first detection means;

calculating a variation between one of the operating conditions detected by said first detection means under the initial flow rate and under the predetermined flow rate, and comparing the variation of said one of the operating conditions with a first predetermined value for determining whether said exhaust gas return control system is out of order by diagnosing means;

detecting a rate of change of a second one of the operating conditions every predetermined period of time by second detection means by determining a difference between a current detected value representing said second one of the operating conditions and an immediately preceding detected value representing said second one of the operating conditions; and suspending a trouble diagnosis operation for said exhaust gas return control system when the rate of change detected by said second detection means exceeds a second predetermined value by suspending means. a rate of change of a second one of the operating conditions every predetermined period of time independent from a detecting operation performed by said first detection means; and means for suspending a trouble diagnosis operation for said exhaust gas return control system when the rate of change detected by said second detection means exceeds a second predetermined value, said rate of change being determined by a difference between a current detected value representing said second one of the operating conditions and an immediately preceding detected value representing said second one of the operating conditions.

* * * * *